(12) United States Patent
Salter et al.

(10) Patent No.: US 10,041,650 B2
(45) Date of Patent: Aug. 7, 2018

(54) ILLUMINATED INSTRUMENT PANEL STORAGE COMPARTMENT

(71) Applicant: Ford Global Technologies, LLC, Dearborn, MI (US)

(72) Inventors: Stuart C. Salter, White Lake, MI (US); Scott Holmes Dunham, Redford, MI (US); Kathleen M. Parlow, Columbus, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 189 days.

(21) Appl. No.: 14/684,973

(22) Filed: Apr. 13, 2015

(65) Prior Publication Data

US 2015/0217683 A1    Aug. 6, 2015

Related U.S. Application Data

(63) Continuation-in-part of application No. 14/603,636, filed on Jan. 23, 2015, now Pat. No. 9,573,517, which
(Continued)

(51) Int. Cl.
| | |
|---|---|
| *B60Q 3/68* | (2017.01) |
| *F21V 9/30* | (2018.01) |
| *F21V 9/16* | (2006.01) |
| *H05B 37/02* | (2006.01) |
| *B60Q 3/66* | (2017.01) |

(Continued)

(52) U.S. Cl.
CPC ............. *F21V 9/30* (2018.02); *B60Q 3/225* (2017.02); *B60Q 3/66* (2017.02); *B60Q 3/68* (2017.02); *F21V 9/16* (2013.01); *H05B 37/0218* (2013.01); *H05B 37/0227* (2013.01); *B60Q 3/217* (2017.02); *B60Q 3/80* (2017.02); *Y02B 20/46* (2013.01)

(58) Field of Classification Search
CPC .......... B60Q 3/022; B60Q 3/225; B60Q 3/68; B60Q 3/66; B60Q 3/10; B60Q 3/14; B60Q 3/30; F21V 9/16
See application file for complete search history.

(56) References Cited

U.S. PATENT DOCUMENTS

| | | | |
|---|---|---|---|
| 2,486,859 A | 11/1949 | Meijer et al. | |
| 5,032,957 A * | 7/1991 | Canfield | A47B 81/00 362/133 |

(Continued)

FOREIGN PATENT DOCUMENTS

| | | |
|---|---|---|
| CN | 201169230 Y | 12/2008 |
| CN | 101337492 A | 1/2009 |

(Continued)

*Primary Examiner* — Anabel Ton
(74) *Attorney, Agent, or Firm* — Vichit Chea; Price Heneveld LLP

(57) ABSTRACT

An illuminated storage assembly disposed within a vehicle is provided herein. The illuminated storage assembly includes a housing defining a storage compartment laterally extending into an instrument panel. A cover is operably coupled to the housing to support the cover between open and closed positions. A light source is disposed within the illuminated storage assembly and is configured to illuminate a feature of the illuminated storage assembly based on the position of the cover.

20 Claims, 8 Drawing Sheets

Related U.S. Application Data is a continuation-in-part of application No. 14/086,442, filed on Nov. 21, 2013.

(51) Int. Cl.
- *B60Q 3/225* (2017.01)
- *B60Q 3/217* (2017.01)
- *B60Q 3/80* (2017.01)

(56) References Cited

U.S. PATENT DOCUMENTS

| | | |
|---|---|---|
| 5,053,930 A | 10/1991 | Benavides |
| 5,086,510 A * | 2/1992 | Guenther ............... B60K 35/00 455/128 |
| 5,434,013 A | 7/1995 | Fernandez |
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,294,990 B1 | 9/2001 | Knoll et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,832,803 B2 * | 12/2004 | Elliott .................. B60J 7/104 296/100.01 |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,439,418 B1 * | 5/2013 | Lovejoy .................. B60R 7/06 296/37.12 |
| 8,459,832 B2 | 6/2013 | Kim |
| 8,466,438 B2 | 6/2013 | Lambert et al. |
| 8,485,582 B2 * | 7/2013 | Sakai .................... B60Q 3/225 296/37.12 |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,562,058 B1 * | 10/2013 | Kim ........................ B60R 7/06 296/37.12 |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,434,302 B2 * | 9/2016 | Salter .................... B60Q 3/022 |
| 9,568,659 B2 | 2/2017 | Verger et al. |
| 9,616,812 B2 | 4/2017 | Sawayanagi |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0177398 A1 * | 8/2007 | Uematsu ................. B60Q 1/32 362/493 |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0119043 A1 * | 5/2014 | Kodama .................. B60Q 3/20 362/551 |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |

(56) References Cited

U.S. PATENT DOCUMENTS

| | | | |
|---|---|---|---|
| 2015/0197189 A1* | 7/2015 | Salter | B60Q 3/022 362/510 |
| 2015/0217683 A1* | 8/2015 | Salter | B60Q 3/022 362/510 |
| 2015/0267881 A1 | 9/2015 | Salter et al. | |
| 2015/0307033 A1 | 10/2015 | Preisler et al. | |
| 2016/0016506 A1 | 1/2016 | Collins et al. | |
| 2016/0102819 A1 | 4/2016 | Misawa et al. | |
| 2016/0131327 A1 | 5/2016 | Moon et al. | |
| 2016/0236613 A1 | 8/2016 | Trier | |
| 2017/0158125 A1 | 6/2017 | Schuett et al. | |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

\* cited by examiner

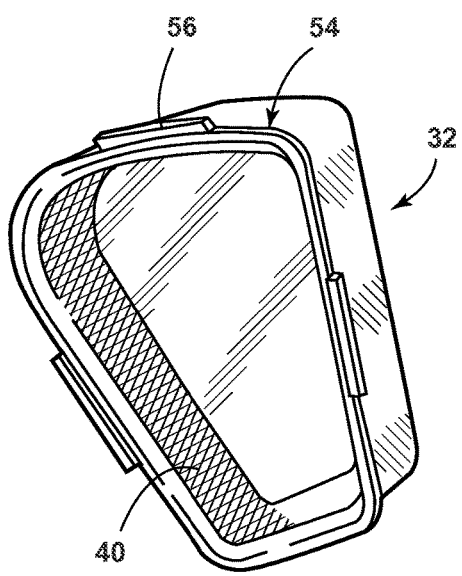
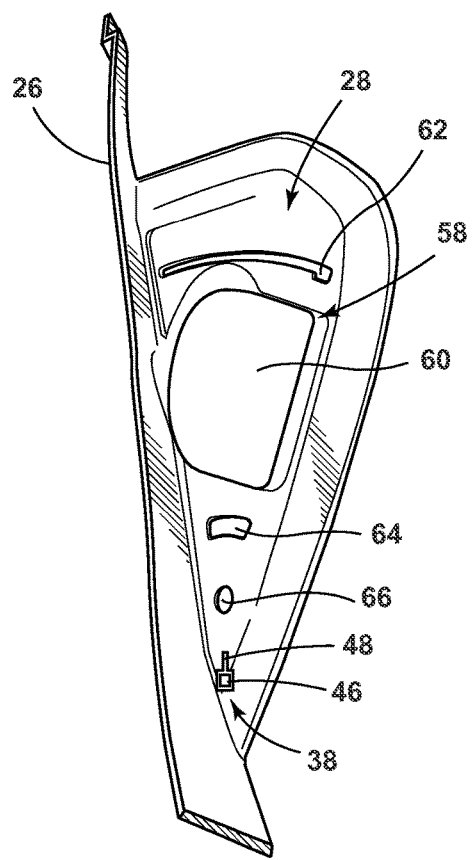
FIG. 5
FIG. 6

ILLUMINATED INSTRUMENT PANEL STORAGE COMPARTMENT

CROSS-REFERENCE TO RELATED APPLICATIONS

This application is a continuation-in-part of U.S. patent application Ser. No. 14/603,636, filed Jan. 23, 2015, and entitled "DOOR ILLUMINATION AND WARNING SYSTEM," which is a continuation-in-part of U.S. patent application Ser. No. 14/086,442, filed Nov. 21, 2013, and entitled "VEHICLE LIGHTING SYSTEM WITH PHOTOLUMINESCENT STRUCTURE." The aforementioned related applications are hereby incorporated by reference by reference in their entirety.

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present disclosure, an illuminated storage assembly for a vehicle is disclosed. The storage assembly includes a housing having an aperture. The aperture opens into a storage compartment laterally extending into the instrument panel. A cover is pivotally coupled to the housing for covering the aperture in a closed position and allowing access to the storage compartment in an open position. A light source is configured to illuminate the compartment.

According to another aspect of the present disclosure, an illuminated storage assembly for a vehicle is disclosed. The storage assembly includes a housing having a pivot aperture and a storage compartment laterally extending into an instrument panel. A cover having guide members is operably coupled to the pivot aperture to rotatably support the cover between open and closed positions. A light source is configured to excite a luminescent portion within the storage compartment.

According to another aspect of the present disclosure, a storage assembly for an instrument panel is disclosed. The storage assembly includes a light source and a housing including a storage compartment. A cover having a light transmissive portion is coupled to the housing and is movable between open and closed positions. The storage compartment illuminates in response to light emitted from the light source when the cover is in the open position and the light transmissive portion illuminates when the cover is in the closed position.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 5 is a perspective view of an exemplary storage compartment;

FIG. 6 is a perspective view of a housing, according to one embodiment;

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes an illuminated panel end cap assembly for a vehicle. In some embodiments, the compartment may advantageously employ one or more photoluminescent structures to illuminate in response to pre-defined events. The one or more photoluminescent structures may be configured to convert light received from an associated light source and re-emit the light at a different wavelength typically found in the visible spectrum.

It is noted that the present invention includes an illuminated panel end cap assembly which is adapted to be coupled to an instrument panel at either the left-hand or right-hand ends of the instrument panel. The left-hand and right-hand panel end cap cover assemblies will function in a similar manner having nearly identical componentry; however, the assemblies are mirror images of each other as disposed on opposing ends of the vehicle instrument panel. Further, as noted throughout this disclosure, the term "vehicle door" will be used to identify a passenger door on a vehicle as opposed to the end cap door assembly being specifically disclosed.

Figure 1A:
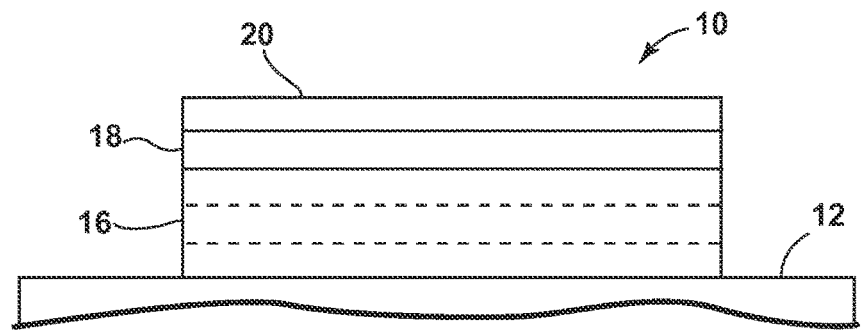
FIG. 1A is a side view of a photoluminescent structure rendered as a coating for use in a luminescent trim light assembly according to one embodiment.
Figure 1B:
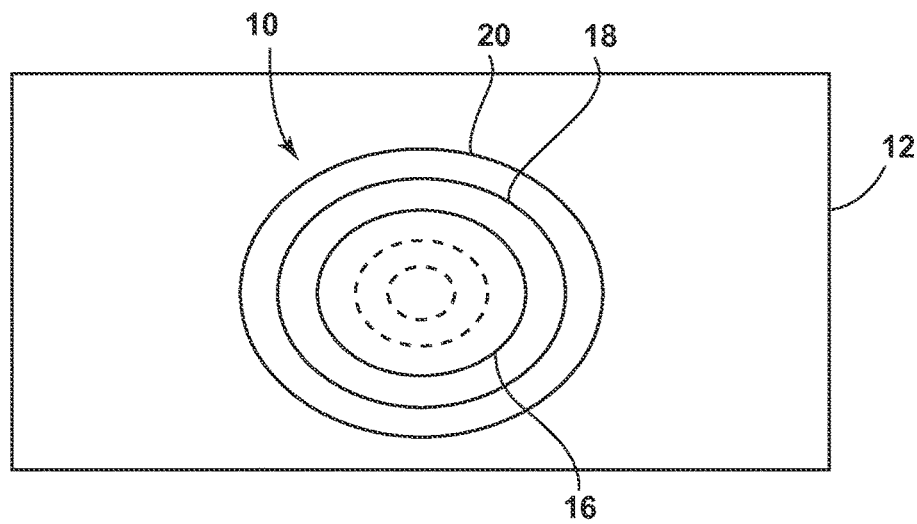
FIG. 1B is a top view of a photoluminescent structure rendered as a discrete particle according to one embodiment.
Figure 1C:
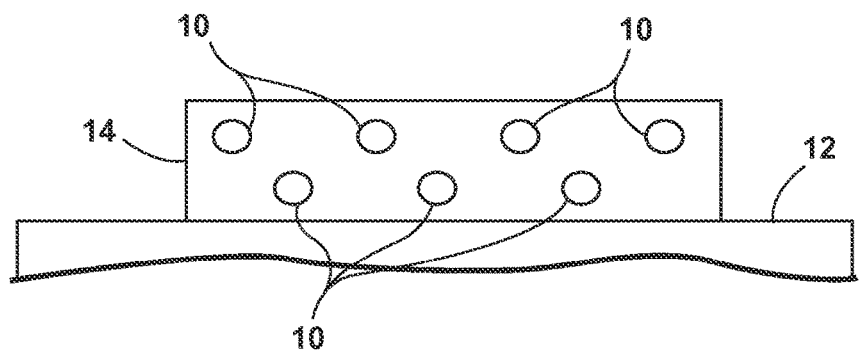
FIG. 1C is a side view a plurality photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle related piece of equipment. In FIG. 1A, the photoluminescent structure 10 is generally shown rendered as a coating (e.g. a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g. a film) that may then be applied (as shown) or integrated with the substrate 12.

At the most basic level, a given photoluminescent structure 10 includes an energy conversion layer 16 that may include one or more sub layers, which are exemplarily shown through broken lines in FIGS. 1A and 1B. Each sub layer of the energy conversion layer 16 may include one or more photoluminescent materials having energy converting elements with phosphorescent or fluorescent properties. Each photoluminescent material may become excited upon receiving light of a specific wavelength, thereby causing the light to undergo a conversion process. According to the principle of down conversion, the inputted light is converted into a longer wavelength light that is outputted from the photoluminescent structure 10. Conversely, according to the principle of up conversion, the inputted light is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

In some embodiments, light that has been down converted or up converted may be used to excite other photoluminescent material(s) found in the energy conversion layer 16. The process of using converted light outputted from one photoluminescent material to excite another, and so on, is generally known as an energy cascade and may serve as an alternative for achieving various color expressions. With respect to either conversion principle, the difference in wavelength between the exciting light and the converted light is known as the Stokes shift and serves as the principle driving mechanism for an energy conversion process corresponding to a change in wavelength of light. In the various implementations discussed herein, each of the photoluminescent structures may operate under either conversion principle.

The energy conversion layer 16 may be prepared by dispersing the photoluminescent material in a polymer matrix to form a homogenous mixture using a variety of methods. Such methods may include preparing the energy conversion layer 16 from a formulation in a liquid carrier medium and coating the energy conversion layer 16 to a desired substrate. The energy conversion layer 16 may be applied to a substrate by painting, screen printing, spraying, slot coating, dip coating, roller coating, and bar coating. Alternatively, the energy conversion layer 16 may be prepared by methods that do not use a liquid carrier medium. For example, the energy conversion layer 16 may be rendered by dispersing the photoluminescent material into a solid state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate using any methods known to those skilled in the art. When the energy conversion layer 16 includes sub layers, each sub layer may be sequentially coated to form the energy conversion layer 16. Alternatively, the sub layers can be separately prepared and later laminated or embossed together to form the energy conversion layer 16. Alternatively still, the energy conversion layer 16 may be formed by coextruding the sub layers.

Referring back to FIGS. 1A and 1B, the photoluminescent structure 10 may optionally include at least one stability layer 18 to protect the photoluminescent material contained within the energy conversion layer 16 from photolytic and thermal degradation. The stability layer 18 may be configured as a separate layer optically coupled and adhered to the energy conversion layer 16. Alternatively, the stability layer 18 may be integrated with the energy conversion layer 16. The photoluminescent structure 10 may also optionally include a protection layer 20 optically coupled and adhered to the stability layer 18 or other layer (e.g., the conversion layer 16 in the absence of the stability layer 18) to protect the photoluminescent structure 10 from physical and chemical damage arising from environmental exposure. The stability layer 18 and/or the protective layer 20 may be combined with the energy conversion layer 16 through sequential coating or printing of each layer, sequential lamination or embossing, or any other suitable means.

Additional information regarding the construction of photoluminescent structures is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM," filed Jun. 26, 2012; U.S. Pat. No. 8,247,761 to Agrawal et al., entitled "PHOTOLUMINESCENT MARKINGS WITH FUNCTIONAL OVERLAYERS," filed Aug. 21, 2012; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Aug. 27, 2013; U.S. Pat. No. 8,664,624 B2 to Kingsley et al., entitled "ILLUMINATION DELIVERY SYSTEM FOR GENERATING SUSTAINED SECONDARY EMISSION," filed Mar. 4, 2014; U.S. Patent Publication No. 2012/0183677 to Agrawal et al., entitled "PHOTOLUMINESCENT COMPOSITIONS, METHODS OF MANUFACTURE AND NOVEL USES," filed Jul. 19, 2012; U.S. Patent Publication No. 2014/0065442 A1 to Kingsley et al., entitled "PHOTOLUMINESCENT OBJECTS," filed Mar. 6, 2014; and U.S. Patent Publication No. 2014/0103258 A1 to Agrawal et al., entitled "CHROMIC LUMINESCENT COMPOSITIONS AND TEXTILES," filed Apr. 17, 2014, all of which are incorporated herein by reference in their entirety.

Figure 2:
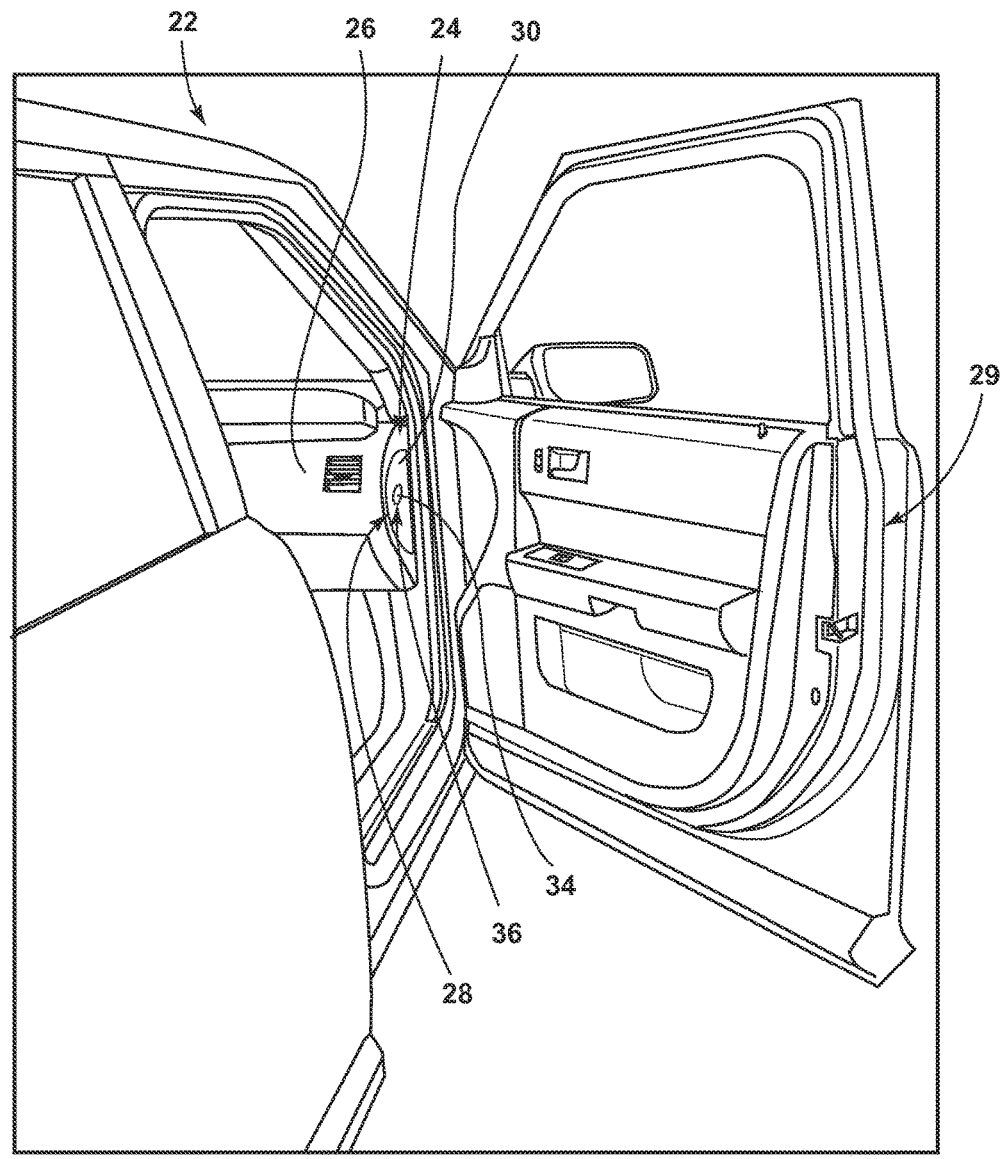
FIG. 2 is a perspective view of the illuminated panel end cap assembly with the cover in the closed position according to one embodiment.

Referring to FIG. 2, a vehicle 22 is illustrated having an illuminated panel end cap assembly 24 for use on an end of an instrument panel 26 or vehicle dashboard. The illuminated panel end cap assembly 24 includes a housing 28 and a cover 30 shown in a closed position in FIG. 1. The cover 30 is pivotally coupled to the housing 28 such that the cover 30 is adapted to articulate between the closed position illustrated in FIG. 1 and an open position, as shown in FIG. 5, along an articulation path or rotational axis. The housing 28 includes a base panel portion, which may be adapted to couple to an instrument panel 26 disposed within a vehicle interior. Alternatively, the housing 28 may be formed integrally with the instrument panel 26.

The cover 30 is pivotally coupled to the housing 28 and provides access to a storage compartment 32 disposed within the instrument panel 26. Further, a first feature of the storage compartment 32 may be illuminated when the cover 30 is placed in a first position and a second feature may be illuminated when the cover 30 is placed in a second position. For example, the cover 30 may have a light transmissive (i.e., transparent and/or translucent) portion 34 disposed therein. The light transmissive portion 34 may further include an indicia or emblem thereon. A photoluminescent portion 36 containing at least one photoluminescent structure 10 may be disposed on the light transmissive portion 34 of the cover 30. A light source 38 (FIG. 3) may be disposed within the illuminated panel end cap assembly 24 that is configured to emit light at a first wavelength thereby providing illumination to the light transmissive portion 34 of the cover 30. Alternatively, the light source 38 may emit light at a first wavelength that excites the photoluminescent portion 36 thereby emitting a second wavelength through the light transmissive portion 34 of the cover 30 when the cover 30 is in the closed position.

A second photoluminescent portion 40 may be disposed within and/or on the storage compartment 32 of the illuminated panel end cap assembly 24 that is excited by the light source 38. The light source 38 may be configured to illuminate the storage compartment 32 when the cover 30 is moved to the open position. Alternatively, the light source 38 may be configured to excite the second photoluminescent portion 40 disposed in the storage compartment 32 causing a portion of the storage compartment 32 to luminesce. Thus, according to one embodiment, a portion of the cover 30 may be illuminated when the cover 30 is placed in the closed position and a portion of the storage compartment 32 may be illuminated when the cover 30 is placed in the open position.

Figure 3:
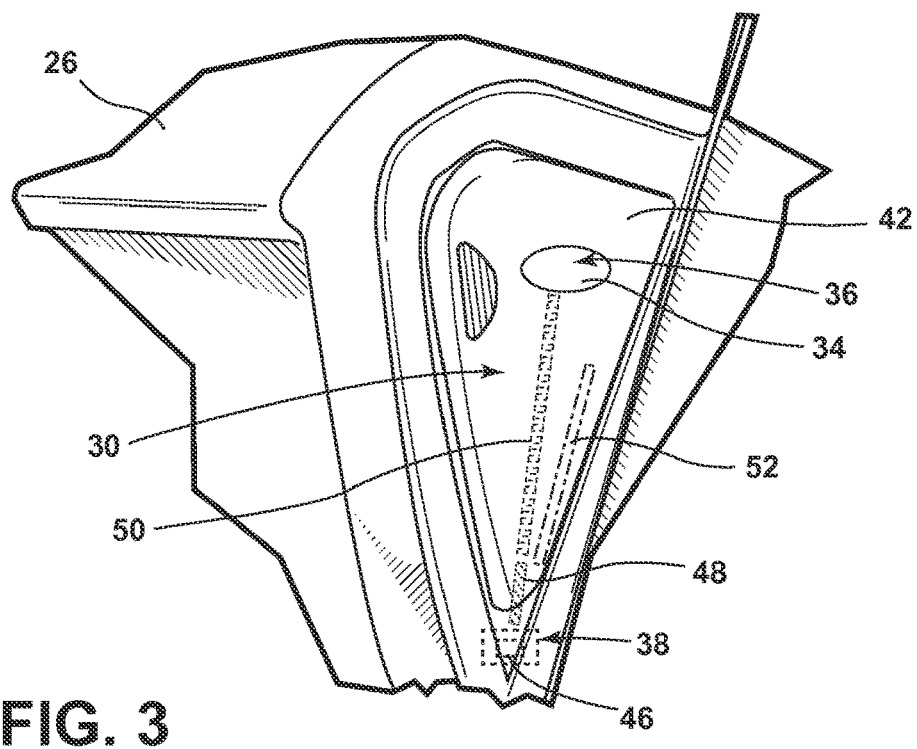
FIG. 3 is a fragmentary perspective view of the illuminated panel end cap assembly disposed on an instrument panel including a plurality of light guides.
Figure 4:
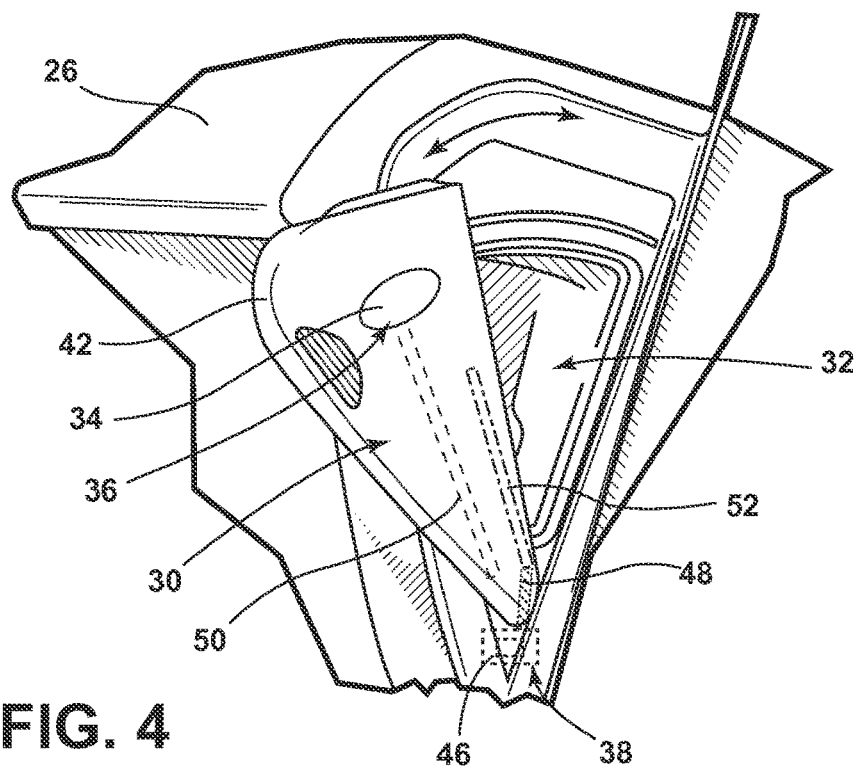
FIG. 4 is a fragmentary perspective view of the illuminated panel end cap assembly of FIG. 3 having the cover in the open position, thereby exposing an exemplary storage compartment.

Referring to FIGS. 3 and 4, the cover 30 is illustrated in the closed position and the open position, respectively, according to one embodiment. The viewable portion 42 of the cover 30 may include a light transmissive portion 34 and one or more substantially opaque portions, which may be configured as opaque coatings applied to the viewable portion 42. In alternative embodiments, light transmissive portions 34 and opaque portions may compromise different materials formed integrally as the cover 30, or the differing portions may later be attached by any method known in the art, e.g., adhesive attached portions.

The light transmissive portion 34 may also include a photoluminescent portion 36 coupled to the B-side 44 (FIG. 7) of the light transmissive portion 34 and configured to luminesce in response to excitation by light emitted from one or more light sources 38 disposed within the illuminated panel end cap assembly 24. The light sources 38 may be configured as light emitting diodes (LEDs) 46 emitting a wavelength of light that is characterized as ultraviolet light (~10-400 nanometers in wavelength), violet light (~380-450 nanometers in wavelength), or blue light (~450-495 nanometers in wavelength) to take advantage of the relative low cost attributable to those types of LEDs 46.

To obtain a uniform illumination of the light transmissive portion 34, light source 38 may be configured to emit non-focused light along a first light guide 48 to a location proximate the illuminated panel end cap assembly 24. A second light guide 50 is disposed on or within the cover 30 to direct light from the first light guide 48 to the light transmissive portion 34 of the cover 30 when the second light guide 50 is proximate the first light guide 48. A photoluminescent portion 36 may be disposed on or near the light transmissive portion 34 of the cover 30, which is excitable by the light emitted by the light guide(s) 48, 50. Additionally, a third light guide 52 may be disposed proximately to the second light guide 50. The third light guide 52 may have light directed therethrough when the cover 30 is placed in the open position thereby placing the third light guide 52 near the first light guide 48. The third light guide 52, when illuminated, may emit light towards the storage compartment 32 as the storage compartment 32 is in the accessible position. Further, a second photoluminescent portion 40 may be disposed on the third light guide 52 and/or a portion of the storage compartment 32. The second photoluminescent portion 40 is excited by light emitted from the light source 38 thereby providing uniform illumination to the storage compartment 32.

According to one embodiment, light emitted from light sources 38 is converted by the photoluminescent portion(s) 36, 40 into light of a longer wavelength and outputted therefrom. The converted light corresponds to a visible light, which includes the portion of the electromagnetic spectrum that can be detected by the human eye (~390-700 nanometers in wavelength) and may be expressed in a variety of colors defined by a single wavelength (e.g., red, green, blue) or a mixture of multiple wavelengths (e.g., white). Thus, it should be understood that the photoluminescent portion(s) 36, 40 may be configured such that converted light outputted therefrom is capable of being expressed as unicolored or multicolored light. According to one embodiment, light source 38 is configured to emit blue light and the photoluminescent portion(s) 36, 40 are configured to convert the blue light into a neutral white light having a color temperature of approximately 4000K to 5000K. The converted light escapes from the illuminated panel end cap assembly 24 via the light transmissive portion 34, thereby causing the light transmissive portion 34 to glow or through the storage compartment 32, thereby illuminating the storage compartment 32 for a vehicle 22 occupant.

Referring to FIG. 5, an exemplary storage compartment 32, according to one embodiment, is shown. It is contemplated that the storage compartment 32 can be used to house items such as keys, wallets, or mobile devices, or any other item an occupant desires to conceal within the vehicle 22. The storage compartment 32 includes a perimeter 54 which has a number of coupling mechanisms 56 disposed thereon. In assembly, the coupling mechanisms 56 are adapted to couple the storage compartment 32 to a component on the instrument panel 26, such as housing 28 shown in FIG. 6, at a rim portion 58 disposed about a perimeter of aperture 60 of the housing 28. In this way, the storage compartment 32 couples to the housing 28 to substantially fill the opening of aperture 60 disposed in the housing.

A second photoluminescent 40 material may be coupled to, or integrated with, any or all of the interior surface(s) of the storage compartment 32 and configured to illuminate when excited by the light source 38 disposed within the panel end cap assembly 24. Alternatively, the second photoluminescent portion 40 may be disposed on any of the light guides 48, 50, 52 thereby providing uniform illumination to any vehicle component proximate the illuminated panel end cap assembly 24. In various embodiments of the disclosed subject matter, each photoluminescent portion 36, 40 may be disposed on the same illuminated panel end cap assembly 24 component and/or may comprise a logo, emblem, text, decal, badge, and/or any other form of illuminated portion proximate the illuminated panel end cap assembly 24.

In an alternate embodiment, the illuminated panel end cap assembly 24 may comprise a second light source (not shown) having a second wavelength that is different from that of the first light source 38. Thus, the first photoluminescent portion 36 may emit a tertiary emission and the second photoluminescent portion 40 may emit a quaternary emission. The third and fourth wavelengths may correspond to different colors of light than the first wavelength and the second wavelength. As such, the illuminated panel end cap assembly 24 provides for various lighting and color arrangements.

The light emitted from the light source 38 at the first wavelength of light may correspond to a color of light that is less perceptible by the human eye compared to the wavelengths of the first and/or second photoluminescent portions 36, 40. In this advantageous configuration, the first emission of the light emitted from the light source 38 at the first wavelength may be projected, or guided through the use of light guides 48, 50, 52, toward the first and/or second photoluminescent portions 36, 40 without being visibly obvious to an operator and/or passenger utilizing the illuminated panel end cap assembly 24. This configuration may provide for the emissions from the first and/or second photoluminescent portions 36, 40 to be activated by the light source 38 being projected from a single location. In this way, the illuminated panel end cap assembly 24 is configured to provide lighting, ambient lighting, accent lighting, or any other form of lighting from a limited number of light sources 38. By limiting the number of light sources required to provide the lighting discussed herein, the disclosure provides for a cost-effective method for providing lighting for the vehicle 22. Likewise, a single light source 38 may be disposed anywhere within the panel end cap assembly 24 or storage compartment 32 to illuminate any component of the panel end cap assembly 24 or excite any photoluminescent portions 36, 40 disposed within the panel end cap assembly 24.

Referring to FIG. 6, left-hand panel end cap housing 28 is shown having an upper slot 62 and a lower slot 64. The upper and lower slots 62, 64 are arcuately-shaped slots which correspond to the pivotal movement of the cover 30, such as cover 30 shown in FIG. 7 along a rotational axis. The housing 28 may include a plurality of clip mechanisms (not shown) which are adapted to align with and engage attachment apertures (not shown) of the instrument panel 26, or the housing 28 may attach in any other way known in the art. A pivoting aperture 66 is disposed at a lower portion of the housing 28, and like slots 62, 64, the pivoting aperture 66 is a through aperture which is adapted to engage a cover 30 as further described below. It is contemplated, however, that the slots 62, 64 and apertures 66 described herein may alternatively be located on any component, including the cover 30, or that any other attachment mechanism known in the art may be utilized.

Figure 7:
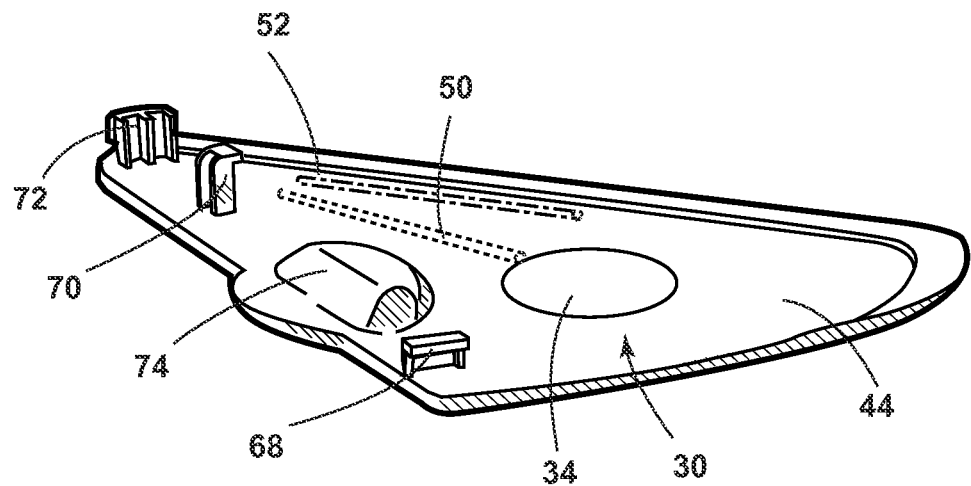
FIG. 7 is a rear perspective view of a cover employing multiple light guides to direct light towards a plurality of components within the assembly.
Figure 8:
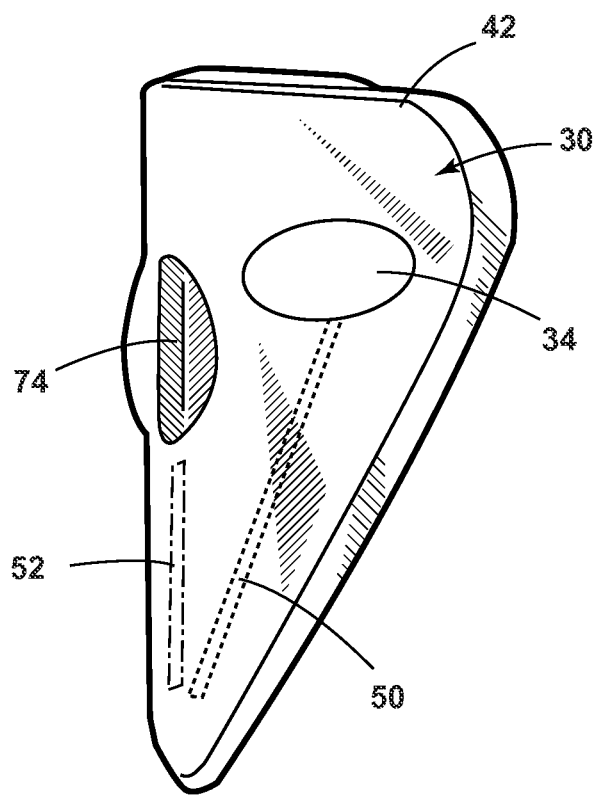
FIG. 8 is a front perspective view of a cover employing multiple light guides.

Referring now to FIGS. 7 and 8, a left-hand cover 30 is shown having an interior side and an exterior side, respectively. Extending outwardly from the interior side, upper 68 and lower 70 guide members are shown which are adapted to couple to the upper 62 and lower 64 slots of the housing 28 shown in FIG. 6. As further shown in FIG. 7, a pivot clip 72 is disposed at a lowermost end of the cover 30 and extends outwardly from the interior side of the cover 30. In assembly, the pivot clip 72 is adapted to couple to pivoting aperture 66 disposed on the housing 28 as shown in FIG. 6. In the embodiments shown in FIGS. 7 and 8, the cover 30 includes a handle 74 portion which is a generally cup-shaped structure extending inwardly into exterior surface, or viewable portion 42, of the cover 30. It is contemplated that the handle 74 can be positioned anywhere along the exterior surface of the cover, so long as the handle 74 is accessible to a user when an adjacent vehicle door 29 is ajar. Although the guide members 68, 70 and pivot clips 72 are disposed on the cover in the illustrated embodiment, it is contemplated that the components described herein may be disposed on any component of the assembly. Further, the cover 30 has been described to be adapted to pivot between open and closed positions along a pivoting rotational path; however, it is contemplated that the cover 30 may move between first and second positions through any assembly known in the art.

As described above, the cover 30 may include light guides 50, 52 configured to direct light towards a desired feature of the illuminated panel end cap assembly 24. For example, a light source 38 may be coupled to a first stationary light guide 48. A second light guide 50 may be coupled to the B-side 44 of the cover 30 and positioned adjacently to the first light guide 48 when the cover 30 is in a first position thereby directing light towards a first feature, such as a light transmissive portion 34. A third light guide 52 may also be coupled to the cover 30 and positioned adjacently to the light source 38, or first light guide 48, when the cover 30 is moved to a second position. The third light guide 52 may direct light emitted from the light source 38 towards a second feature, such as the storage compartment 32 illustrated in FIG. 4.

Additional light guides and photoluminescent portions may be added to the illuminated panel end cap assembly 24 to illuminate additional features thereof. For example, a fourth light guide may be disposed on an portion of the cover 30 and configured to direct light from the light source 38 towards the handle 74. An additional photoluminescent portion may be disposed on the handle 24 such that the handle 74 luminesces in response to light emitted from the light source 38. Likewise, it is contemplated that any additional features within the storage compartment 32 may also include additional photoluminescent portions that luminesce in response to light emitted from the light source 38.

Figure 9:
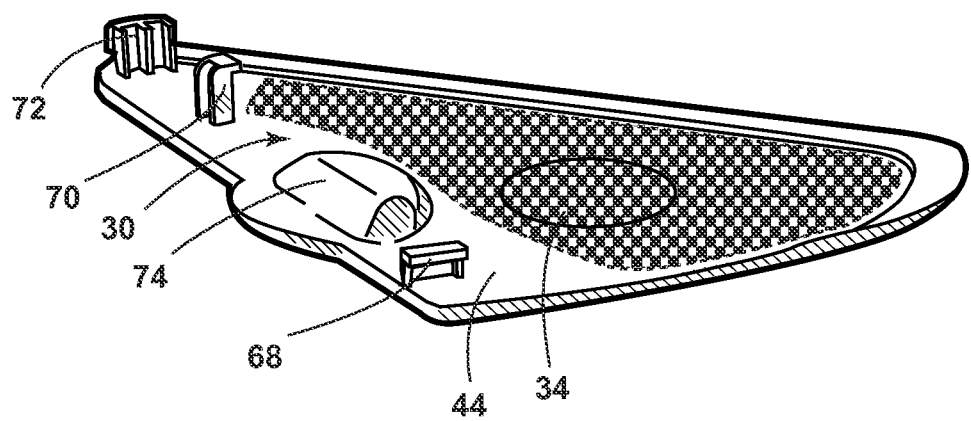
FIG. 9 is a rear perspective of the cover, according to an alternate embodiment, employing an illumination assembly attached to the cover.
Figure 10:
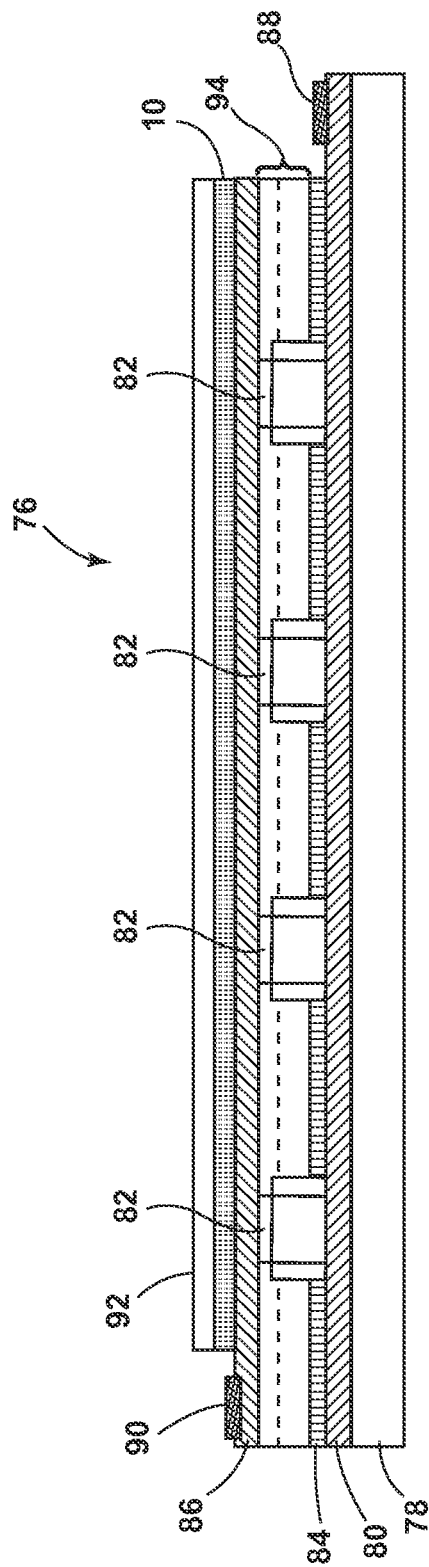
FIG. 10 is a schematic diagram of the illumination assembly utilized in FIG. 9.

Referring to FIGS. 9 and 10, an alternate embodiment of the illuminated panel end cap assembly 24 described herein is illustrated including a light producing assembly 76 as the light source 38 within the assembly. The light producing assembly 76, of the illustrated embodiment, may correspond to a thin-film or printed light emitting diode (LED) assembly disposed on the interior surface of the cover 30 and may be attached to, or formed with, a portion of the illuminated panel end cap assembly 24, such as the cover 30 to provide illumination to features therein.

The light producing assembly 76, according to one embodiment, is disposed on the B-side 44 of the cover 30. The light producing assembly 76 may be configured to illuminate multiple features, such as a light transmissive portion 34 in the cover 30 and the storage compartment 32, simultaneously or individually.

Referring to FIG. 10, an exemplary schematic diagram of the light producing assembly 76 is illustrated. The printed LED 76 may comprise a substrate 78 as its lowermost layer that includes a polycarbonate, poly-methyl methacrylate (PMMA), or polyethylene terephthalate (PET) material on the order of 0.005 to 0.060 inches thick and is arranged over the intended vehicle surface on which the molding is to be received. Alternatively, as a cost saving measure, the substrate 78 may directly correspond to a preexisting vehicle structure (i.e., the intended vehicle surface). For example, the substrate 78 may correspond to a surface (i.e., the B-side 44) of the cover 30.

The light-producing assembly 76 also includes a positive electrode 80 arranged over the substrate 78. The positive electrode 80 includes a conductive epoxy such as, but not limited to, a silver-containing or copper-containing epoxy. The positive electrode 80 is electrically connected to at least a portion of a plurality of LED sources 82 arranged within a semiconductor ink 84 and applied over the positive electrode 78. Likewise, a negative electrode 86 is also electrically connected to at least a portion of the LED sources 82. The negative electrode 86 is arranged over a dielectric material 94 separating the negative electrode 86 and the semiconductor ink 84. The negative electrode 86 includes a transparent or translucent conductive material such as, but not limited to, indium tin oxide. Similarly, the first electrode 80 may be light transmissive. Additionally, each of the positive and negative electrodes 80, 86 are electrically connected to a controller 88 and a power source 90 via a corresponding bus bar 88, 90.

The LED sources 82 may be dispersed in a random or controlled fashion within the semiconductor ink 84 and may be configured to emit focused or non-focused light toward the photoluminescent structure 10. A light producing assembly protective layer 92, stability layer 18, or combination thereof may be disposed on the photoluminescent structure 10. The LED sources 82 may correspond to micro-LEDs of gallium nitride elements on the order of 5 to 400 microns in size and the semiconductor ink 84 may include various binders and dielectric material 94 including, but not limited to, one or more of gallium, indium, silicon carbide, phosphorous and/or translucent polymeric binders. In this manner, the semiconductor ink 84 may contain various concentrations of LED sources 82 such that the density of the LED sources 82 may be adjusted for various lighting applications. In some embodiments, the LED sources 82 and semiconductor ink 84 may be sourced from Nth Degree Technologies Worldwide Inc. The semiconductor ink 84 can be applied through various printing processes, including ink jet and silk screen processes to selected portion(s) of the positive electrode 80. More specifically, it is envisioned that the LED sources 82 are dispersed within the semiconductor ink 84, and shaped and sized such that a substantial quantity of them align with the positive and negative electrodes 80, 86 during deposition of the semiconductor ink 84. The portion of the LED sources 82 that ultimately are electrically connected to the positive and negative electrodes 80, 86 may be illuminated by a combination of the controller 88, power source 90, and associated wiring. According to one embodiment, the power source 88 may correspond to a vehicular power source operating at 12 to 16 VDC. Additional information regarding the construction of a light-producing assemblies is disclosed in U.S. Patent Publication No. 2014/0264396 A1 to Lowenthal et al., entitled "ULTRA-THIN PRINTED LED LAYER REMOVED FROM SUBSTRATE," filed Mar. 12, 2014, the entire disclosure of which is incorporated herein by reference.

Further, varying types of LEDs 82 may be employed within the same light producing assembly 76. A first LED may emit light at a first wavelength thereby illuminating a first feature of the illuminated panel end cap assembly 24. A second LED may emit light at a second wavelength causing a portion of the illuminated panel end cap assembly 24 to luminesce in response. Additional LEDs may also be added that either cause additional features or photoluminescent portions to illuminate or luminesce.

Figure 11:
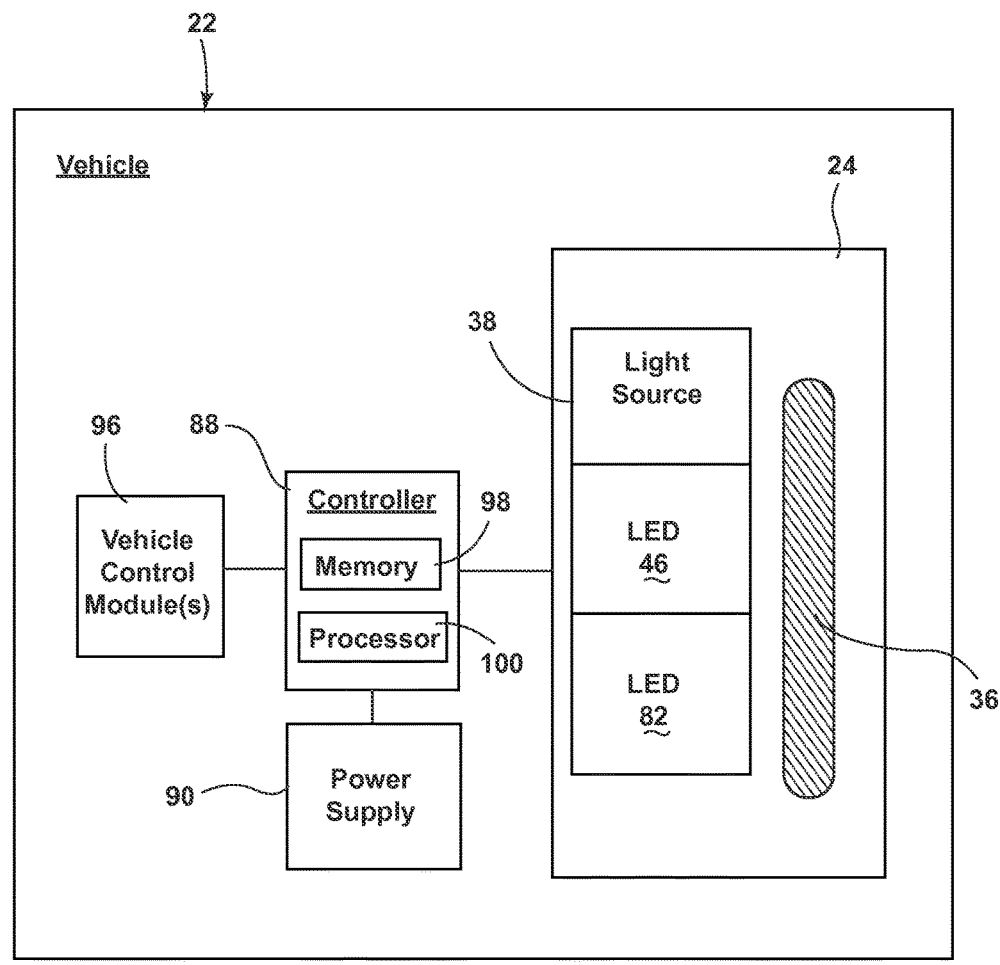
FIG. 11 is block diagram of the illuminated panel end cap assembly.

Referring to FIG. 11, a box diagram of a vehicle 22 is shown in which an illuminated panel end cap assembly 24 is implemented. The illuminated panel end cap assembly 24 includes a controller 88 in communication with the light source 38. The controller 88 may include memory 98 having instructions contained therein that are executed by a processor 100 of the controller 88. The controller 88 may provide electrical power to the light source 38, or to a respective bus bar 88, 90, via a power supply 90 located onboard the vehicle 22. In addition, the controller 88 may be configured to control the light output of each light source 38 based on feedback received from one or more vehicle control modules 96 such as, but not limited to, a body control module, engine control module, steering control module, brake control module, the like, or a combination thereof. By controlling the light output of the light source 38, the illuminated panel end cap assembly 24 may illuminate in a variety of colors and/or patterns to provide an aesthetic appearance, or may provide vehicle information to an intended observer. For example, when a vehicle door 29 is ajar, the transmissive portion 34 of the cover 30 may illuminate when the cover 30 is placed in a closed position and a storage compartment 32 may illuminate when the cover 30 is placed in an open position.

In operation, the photoluminescent portion 36 may exhibit a constant unicolor or multicolor illumination. For example, the controller 88 may prompt the light source 38 to emit only the first wavelength of light via an LED 46 to cause a photoluminescent portion 36 to illuminate in the first color (e.g., white). Alternatively, the controller 88 may prompt the light source 38 to emit only the second wavelength of light via the LED 46 to cause the photoluminescent portion 36 to illuminate in the second color (e.g., red). Alternatively still, the controller 88 may prompt the light source 38 to simultaneously emit the first and second wavelengths of light to cause the photoluminescent portion 36 to illuminate in a third color (e.g. pinkish) defined by an additive light mixture of the first and second colors. Moreover, additional photoluminescent portions 40 may be added to the illuminated panel end cap assembly 24 that converts the first and/or second emissions from the light source 38 to a third and/or fourth emissions. The third and fourth emissions may be of any wavelength and may combine to form a substantially white light proximate the illuminated panel end cap assembly 24.

In another embodiment, the photoluminescent portion 36 may exhibit periodic unicolor or multicolor illumination. For example, the controller 88 may prompt the light source 38 to periodically emit only the first wavelength of light via the LEDs 46 to cause the photoluminescent portion 36 to periodically illuminate in the first color. Alternatively, the controller 88 may prompt the light source 38 to periodically emit only the second wavelength of light via LED 46 to cause the photoluminescent portion 36 to periodically illuminate in the second color. Alternatively, the controller 88 may prompt the light source 38 to simultaneously and periodically emit the first and second wavelengths of light to cause the photoluminescent portion 36 to periodically illuminate in a third color defined by an additive light mixture of the first and second colors. Alternatively still, the controller 88 may prompt the light source 38 to alternate between periodically emitting the first and second wavelengths of light to cause the photoluminescent portion 36 to periodically illuminate by alternating between the first and second colors. The controller 88 may prompt the light source 38 to periodically emit the first and/or second wavelengths of light at a regular time interval and/or an irregular time interval.

With respect to the above examples, the controller 88 may modify the intensity of the emitted first and second wavelengths of light by pulse-width modulation or current control. In some embodiments, the controller 88 may be configured to adjust a color of the emitted light by sending control signals to adjust an intensity or energy output level of the light source 38. For example, if the light source 38 is configured to output the first emission at a low level, substantially all of the first emission may be converted to the second emission. In this configuration, a color of light corresponding to the second emission may correspond to the color of the emitted light from the illuminated panel end cap assembly 24. If the light source 38 is configured to output the first emission at a high level, only a portion of the first emission may be converted to the second emission. In this configuration, a color of light corresponding to mixture of the first emission and the second emission may be output as the emitted light emitted light. In this way, each of the controllers 88 may control an output color of the emitted light.

Though a low level and a high level of intensity are discussed in reference to the first emission, it shall be understood that the intensity of the first emission may be varied among a variety of intensity levels to adjust a hue of the color corresponding to the emitted light from the illuminated panel end cap assembly 24. As described herein, the color of the second emission may be significantly dependent on the particular photoluminescent structures 10 utilized in the photoluminescent portion 36. Additionally, a conversion capacity of the photoluminescent portion 36 may be significantly dependent on a concentration of the photoluminescent structures 10 utilized in the photoluminescent portion 36. By adjusting the range of intensities that may be output from the light source 38, the concentration and proportions of the photoluminescent structures 10 in the photoluminescent portion 36 and the types of photoluminescent materials utilized in the photoluminescent portion 36 discussed herein may be operable to generate a range of color hues of the emitted light by blending the first emission with the second emission.

Accordingly, an illuminated panel end cap assembly has been advantageously described herein. The lighting system may provide various benefits including a simple and cost-effective means to produce a variety of illumination that may be used as a styling feature and/or to assist an occupant in the usage of the illuminated panel end cap assembly.

It is also important to note that the construction and arrangement of the elements of the disclosure as shown in the exemplary embodiments are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. An illuminated storage assembly for a vehicle comprising:
    an end cap housing having an aperture, the aperture opening into a storage compartment laterally extending into an instrument panel;
    a cover slidably engaged with the housing for covering the aperture in a closed position and allowing access to the storage compartment in an open position; and
    a light source configured to illuminate the compartment.

2. The illuminated storage assembly for a vehicle of claim 1, further comprising:
    upper and lower slots disposed on one of the housing and the cover; and
    upper and lower guide members disposed on the other of the housing and the cover, wherein the upper and lower guide members of the cover are slideably received in the upper and lower slots of the housing respectively.

3. The illuminated storage assembly for a vehicle of claim 1, wherein the end cap housing is configured to operably couple to the instrument panel.

4. The illuminated storage assembly for a vehicle of claim 1, further comprising:
    a first light guide coupled to the light source and configured to direct light towards the storage compartment.

5. The illuminated storage assembly for a vehicle of claim 4, further comprising:
    a light transmissive portion within the cover configured to transmit light therethrough; and
    a second light guide configured to transmit light from the first light guide to the light transmissive portion when the cover is placed in the closed position.

6. The illuminated storage assembly for a vehicle of claim 4, further comprising:

a third light guide attached to a surface of the cover and configured to transmit light from the first light guide to a portion of the storage compartment when the cover is placed in the open position.

7. The illuminated storage assembly for a vehicle of claim 1, further comprising:
a pivot aperture disposed on the housing;
a pivot clip disposed on an interior side of the cover, wherein the pivot clip is adapted to pivotally engage the pivot aperture of the housing.

8. The illuminated storage assembly for a vehicle of claim 1, wherein a surface of the storage compartment is configured to luminesce in response to excitation by light emitted from the first source.

9. The illuminated storage assembly for a vehicle of claim 8, wherein the light transmissive portion is configured to luminesce in response to excitation by light emitted from the first source.

10. The illuminated storage assembly for a vehicle of claim 1, wherein the light source is configured as a light producing assembly that comprises one of a thin-film and printed light emitting diode (LED).

11. The illuminated storage assembly for a vehicle of claim 10, wherein the light producing assembly is disposed on an interior surface of the cover.

12. The illuminated storage assembly for a vehicle of claim 1, wherein the light source illuminates when a vehicle door is ajar.

13. An illuminated storage assembly for a vehicle comprising:
a housing having a pivot aperture and a storage compartment laterally extending into an instrument panel;
a cover having guide members operably coupled to the pivot aperture to rotatably support the cover between open and closed positions; and
a light source configured to excite a luminescent portion within the storage compartment.

14. The illuminated storage assembly for a vehicle of claim 13, further comprising:
a handle disposed on an exterior side of the cover.

15. The illuminated storage assembly for a vehicle of claim 13, wherein the light source illuminates when the vehicle door is ajar.

16. The illuminated storage assembly for a vehicle of claim 13, where the light source is a light-producing assembly comprising:
a positive electrode electrically connected to at least a portion of a plurality of LED sources arranged within a semiconductor ink and applied over the positive electrode; and
a negative electrode electrically connected to at least a portion of the LED sources and arranged over the semiconductor ink.

17. A storage assembly for an instrument panel comprising:
a light source;
a housing including a storage compartment; and
a cover having a light transmissive portion movably coupled to the housing between open and closed positions, wherein the storage compartment illuminates in response to light emitted from the light source when the cover is in the open position and the light transmissive portion illuminates when the cover is in the closed position.

18. The storage assembly for an instrument panel of claim 17, further comprising:
a first light guide coupled to the light source and configured to emit light towards the storage compartment.

19. The storage assembly for an instrument panel of claim 18, further comprising:
a second light guide configured to transmit light from the first light guide to the light transmissive portion when the cover is placed in the closed position.

20. The storage assembly for an instrument panel of claim 18, further comprising:
a third light guide attached to a surface of the cover and configured to transmit light from the first light guide to a portion of the storage compartment when the cover is placed in the open position.

* * * * *